United States Patent
Georgis et al.

(10) Patent No.: US 11,790,601 B2
(45) Date of Patent: Oct. 17, 2023

(54) MINIMAL VOLUMETRIC 3D ON DEMAND FOR EFFICIENT 5G TRANSMISSION

(71) Applicant: SONY GROUP CORPORATION, Tokyo (JP)

(72) Inventors: Nikolaos Georgis, San Diego, CA (US); Kiyoharu Sassa, Sunnyvale, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/487,290

(22) Filed: Sep. 28, 2021

(65) Prior Publication Data

US 2023/0099605 A1    Mar. 30, 2023

(51) Int. Cl.
| | |
|---|---|
| *G06T 17/00* | (2006.01) |
| *H04L 69/04* | (2022.01) |
| *G06T 9/00* | (2006.01) |
| *G06T 15/20* | (2011.01) |
| *H04N 23/90* | (2023.01) |
| *H04W 84/04* | (2009.01) |

(52) U.S. Cl.
CPC .............. *G06T 17/00* (2013.01); *G06T 9/001* (2013.01); *G06T 15/20* (2013.01); *H04L 69/04* (2013.01); *H04N 23/90* (2023.01); *G06T 2200/08* (2013.01); *G06T 2200/24* (2013.01); *G06T 2210/08* (2013.01); *H04W 84/042* (2013.01)

(58) Field of Classification Search
None
See application file for complete search history.

(56) References Cited

U.S. PATENT DOCUMENTS

| | | | | |
|---|---|---|---|---|
| 2011/0043627 | A1* | 2/2011 | Werling | G06T 17/05 348/143 |
| 2012/0284652 | A1* | 11/2012 | Kuo | H04L 12/2827 715/760 |
| 2016/0036583 | A1* | 2/2016 | Giovannone | H03K 5/135 375/371 |
| 2016/0283081 | A1* | 9/2016 | Johnston | H04N 13/398 |
| 2019/0320135 | A1* | 10/2019 | Cutler | H04N 7/142 |
| 2020/0402248 | A1 | 12/2020 | Siver et al. | |
| 2021/0136342 | A1* | 5/2021 | Bina | H04N 13/344 |
| 2021/0349529 | A1* | 11/2021 | Winold | A61B 5/1124 |

OTHER PUBLICATIONS

Andrew Gilbert et al., "Volumetric performance capture from minimal camera viewpoints", pp. 1-16, Centre for Vision Speech and Signal Processing, University of Surrey, Creative Intelligence Lab, Adobe Research, 2018.

* cited by examiner

*Primary Examiner* — Frank S Chen
(74) *Attorney, Agent, or Firm* — Haverstock & Owens, A Law Corporation (57) ABSTRACT

A minimal volumetric 3D transmission implementation enables efficient transmission of a 3D model to a client device. A volumetric 3D model is generated using a camera rig to capture frames of a subject. A viewer is able to select a view of the subject. A system determines an optimal subset of cameras of the camera rig to utilize to capture frames to generate the volumetric 3D model based on the viewer's selected view. The volumetric 3D model is transmitted to the user device. If the user changes the view, the process repeats, and a new subset of cameras are selected to generate the volumetric 3D model at a different angle.

33 Claims, 5 Drawing Sheets

MINIMAL VOLUMETRIC 3D ON DEMAND FOR EFFICIENT 5G TRANSMISSION

FIELD OF THE INVENTION

The present invention relates to three dimensional graphics. More specifically, the present invention relates to transmission of three dimensional graphics.

BACKGROUND OF THE INVENTION

A 5$^{th}$ generation mobile network is being developed, referred to as 5G. The 5G network is designed to connect virtually everyone and everything together including device and machines not previously connected. The 5G network, like any network, can only handle a limited amount of data. Thus, sending large amounts of data over the network could lead to issues. Since volumetric 3D content includes large amounts of data, transmitting volumetric 3D content inefficiently could cause bandwidth issues.

SUMMARY OF THE INVENTION

A minimal volumetric 3D transmission implementation enables efficient transmission of a 3D model to a client device. A volumetric 3D model is generated using a camera rig to capture frames of a subject. A viewer is able to select a view of the subject. A system determines an optimal subset of cameras of the camera rig to utilize to capture frames to generate the volumetric 3D model based on the viewer's selected view. The volumetric 3D model is transmitted to the user device. If the user changes the view, the process repeats, and a new subset of cameras are selected to generate the volumetric 3D model at a different angle.

In one aspect, a method programmed in a non-transitory memory of a device comprises receiving a user selection of a view from a user device, determining an optimal subset of cameras less than a full set of cameras of a camera rig to acquire data of a subject based on the user selection of the view, generating a volumetric 3D model of the subject based on the user selection of the view and transmitting the volumetric 3D model of the subject to the user device. The method further comprises determining a second optimal subset of cameras less than the full set of cameras when a user changes the view. The method further comprises determining a different optimal subset of cameras less than the full set of cameras when a second user selection of a second view from a second user device is received. The method further comprises compressing the volumetric 3D model before transmitting the volumetric 3D model to the user device. The method further comprises receiving zoom information from the user device to zoom in on the subject. The volumetric 3D model comprises a partial volumetric 3D model less than a full 3D model of the subject. The volumetric 3D model is transmitted over a 5G network. The user selection from the user device is based on a graphical user interface which enables a user to position a virtual camera to specify the view.

In another aspect, an apparatus comprises a non-transitory memory for storing an application, the application for: receiving a user selection of a view from a user device, determining an optimal subset of cameras less than a full set of cameras of a camera rig to acquire data of a subject based on the user selection of the view, generating a volumetric 3D model of the subject based on the user selection of the view and transmitting the volumetric 3D model of the subject to the user device and a processor coupled to the memory, the processor configured for processing the application. The application is further configured for determining a second optimal subset of cameras less than the full set of cameras when a user changes the view. The application is further configured for determining a different optimal subset of cameras less than the full set of cameras when a second user selection of a second view from a second user device is received. The application is further configured for compressing the volumetric 3D model before transmitting the volumetric 3D model to the user device. The application is further configured for receiving zoom information from the user device to zoom in on the subject. The volumetric 3D model comprises a partial volumetric 3D model less than a full 3D model of the subject. The volumetric 3D model is transmitted over a 5G network. The user selection from the user device is based on a graphical user interface which enables a user to position a virtual camera to specify the view.

In another aspect, a system comprises a camera rig comprising a plurality of cameras and a computing device configured for: receiving a user selection of a view from a user device, determining an optimal subset of cameras less than a full set of cameras of the camera rig to acquire data of a subject based on the user selection of the view, generating a volumetric 3D model of the subject based on the user selection of the view and transmitting the volumetric 3D model of the subject to the user device. The computing device is further configured for determining a second optimal subset of cameras less than the full set of cameras when a user changes the view. The computing device is further configured for determining a different optimal subset of cameras less than the full set of cameras when a second user selection of a second view from a second user device is received. The computing device is further configured for compressing the volumetric 3D model before transmitting the volumetric 3D model to the user device. The computing device is further configured for receiving zoom information from the user device to zoom in on the subject. The volumetric 3D model comprises a partial volumetric 3D model less than a full 3D model of the subject. The volumetric 3D model is transmitted over a 5G network. The user selection from the user device is based on a graphical user interface which enables a user to position a virtual camera to specify the view. The plurality of cameras comprises at least 48 cameras.

DETAILED DESCRIPTION OF THE PREFERRED EMBODIMENT

For Live 3D, camera servers capture images and/or video of a subject using many cameras positioned around the subject. For example, 50 to 100 cameras are able to be positioned in various locations to capture a subject from many different angles. A viewer via a client device is able to request a certain virtual camera angle. A NextGen 3D engine (or other engine) identifies the best set of frames to use to synthesize the requested virtual angle. The NextGen 3D engine (or other engine) performs fast 3D modeling with a minimal number of frames to generate a model. The model is compressed and streamed to the client device. As the client changes the viewing angle, the server incrementally supplies new frames. For example, new cameras are utilized to generate the 3D model in addition to the previously utilized cameras, and if there are any cameras that are not helpful based on the current viewing angle, those cameras are able to stop being used. For example, initially at a front angle, cameras 1, 5, 10 and 15 are used, and the viewer changes the view to be more of a front-side view, then cameras 18 and 19 are also used for modeling, and it is determined that camera 1 is no longer helpful, so it is removed from use for generating the 3D model.

Figure 1:
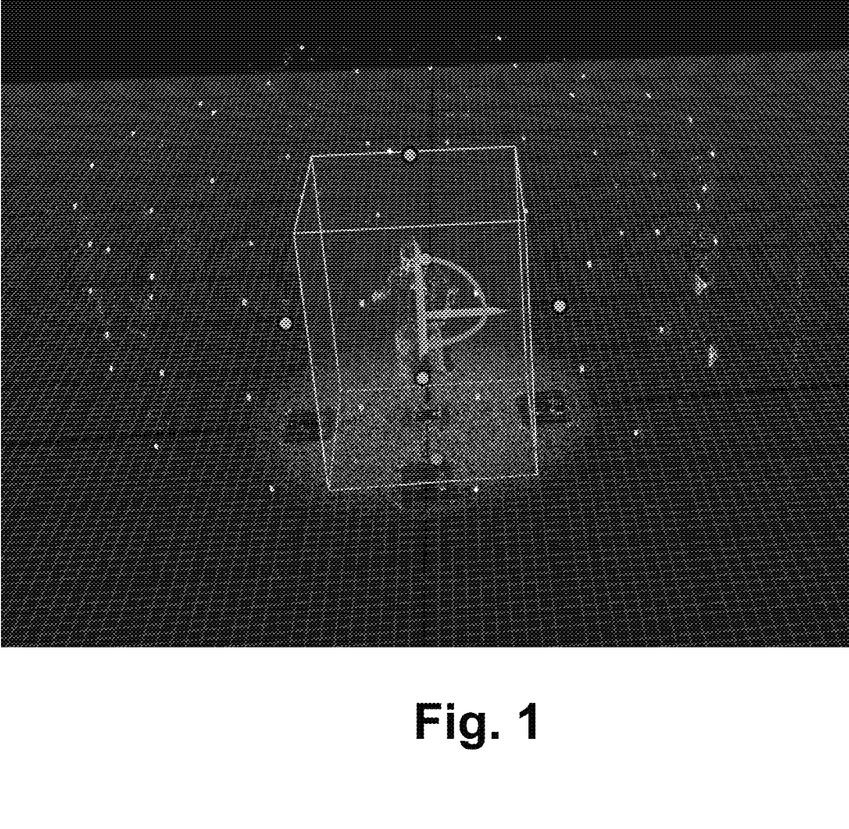
FIG. 1 illustrates a diagram of a subject capture system according to some embodiments.

FIG. 1 illustrates a diagram of a subject capture system according to some embodiments. The subject capture system, or camera rig, is able to include 48 cameras to capture images/videos of a subject from a variety of angles. The number of cameras is able any range from approximately 10 to 100. Any type of camera is able to be used such as 4K or 8K cameras, with high bit rates (e.g., 100 bits per second). The cameras are able to communicate with each other and with other devices (e.g., camera servers also referred to as computing devices). In an example, the system is a 12 foot diameter circular dome with the cameras positioned to capture a subject from many different angles (e.g., front, back, top, side, bottom, and in between). The cameras acquire the images/videos to be able to reconstruct the subject as a 3D model. As the subject moves, every frame is captured using the cameras. The system is able to implement edge processing to generate the 3D models inside a studio or another location. The result is a high quality, animated 3D model in time.

The animated 3D model is streamed to client devices for viewers to watch the animated 3D model. The animated 3D model is able to be streamed using 5G, xG or another network. If all of the content from the 48 cameras was streamed, the amount of data would potentially overwhelm the network. Similarly, processing that much data would take a relatively long period of time.

A viewer who is watching the animated 3D model is able to select which angle the viewer would prefer to view the 3D model. For example, the viewer is watching the animated 3D model using a Web browser and selects to view the 3D model from the side instead of the front. The selection is able to be made in any manner such as a GUI displayed on the browser. The viewer is able to see the 3D model from any angle of the 360 degrees. Although the viewer is able to see the 3D model from any angle, at any one specific time, the viewer only sees the 3D model from a single specific view. For example, if the viewer is watching the 3D model from the front, then the viewer cannot see the back of the 3D model. In some embodiments, the viewer is able to change the angle similarly to moving a virtual camera. For example, the viewer is able to switch to a front view camera, and zoom in on the 3D model's face by moving the virtual camera. The virtual camera and/or the rigging system with the many cameras are able to have the specific camera spacing information and other parameters to be able to adjust the view of the 3D model as the viewer adjusts/moves the virtual camera. There is some optimization based on the photogrammetry ending that means there is some overlap of the views (e.g., 80% overlap between cameras). Based on this, it is able to be determined the number of cameras and which cameras to use for a specific angle/aspect of the 3D model. The viewer is able to control the zoom (e.g., optical or digital) and/or change other camera parameters (e.g., by sending a command via the GUI on the viewer's application to the camera rigging system).

As described, a bi-directional communication channel enables a viewer to select which camera angle to view the 3D model and to receive the 3D model information (e.g., streamed to the viewer's device). The viewer is also able to zoom in or out on a 3D model.

To provide the viewer with the 3D model from the desired angle, the system determines which cameras are to be used to generate that aspect of the 3D model. For example, instead of calculating an entire 3D model of the subject, only a partial 3D model is calculated and generated, where the partial 3D model is based on the current, desired camera angle. Furthering the example, instead of calculating the entire 3D model using captured data from 50 cameras, only data captured from 4 cameras (or another optimized subset) is utilized to generate the partial 3D model. The captured data is used to generate the partial 3D model by implementing texturing, coloring, color estimation, feature mapping and/or any other steps. The partial 3D model is able to be compressed and transmitted to the viewer (e.g., over 5G). This enables real-time processing of the 3D model. The viewer would see the same 3D model as if all 50 cameras were used, since the viewer would only see one view at a time (e.g., when looking at the subject from the front, the back view is not visible).

Multiple users (e.g., viewers) are able to view the 3D model simultaneously. In some embodiments, the number of viewers may be limited to prevent the data usage exceeding the available processing and/or network bandwidth. In some embodiments, viewers are grouped based on the current view they are viewing. For example, if 10 viewers are viewing the 3D model from a front view, then they are all able to receive the same 3D model streaming information. However, if one of the viewers switches the view, then the nine viewers are able to continue viewing the 3D model from the front view, and the viewer who switched views is able to switch to a different group of viewers or his own view. In some embodiments, the optimized subset of cameras to acquire the images/videos of the subject changes as the number of viewers changes depending on their viewing angles. For example, if a viewer is viewing the front of the 3D model, then only 3 cameras are used, but a second viewer is viewing the front, right of the 3D model, so an additional 2 cameras are used, and then a third viewer is viewing the upper, front, right of the 3D model, so an additional camera is used to acquire the content to generate the different aspects of the 3D model.

Figure 2:
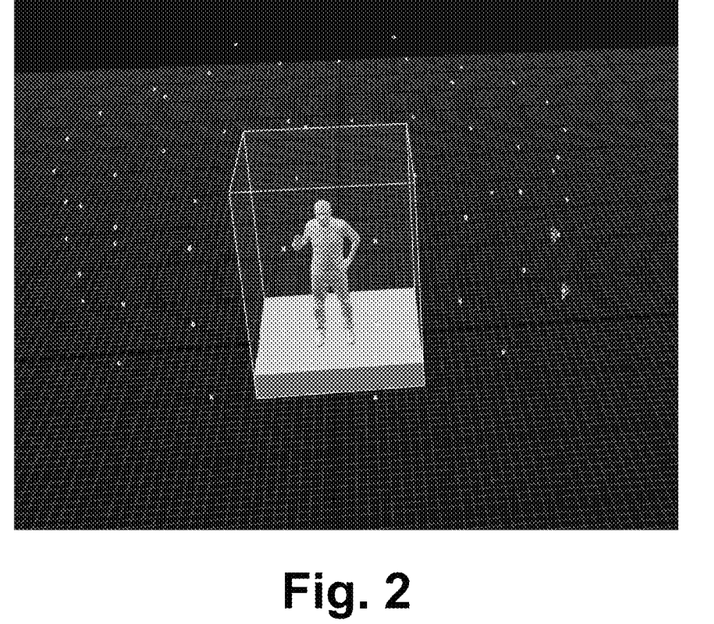
FIG. 2 illustrates a reconstruction of a 3D model of a subject according to some embodiments.

FIG. 2 illustrates a reconstruction of a 3D model of a subject according to some embodiments. If all of the cameras and the data from all of the cameras are used to reconstruct the 3D model, it is a time-consuming process with a significant amount of data. However, if only a small portion of the cameras are utilized, the amount of data to be processed and transmitted to a client device is significantly reduced.

Figure 3:
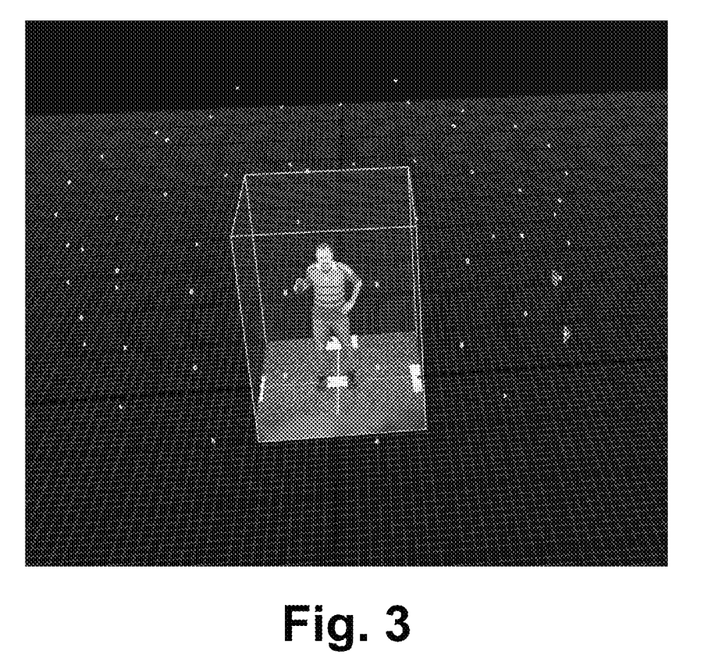
FIG. 3 illustrates a colorized 3D model according to some embodiments.

FIG. 3 illustrates a colorized 3D model according to some embodiments. After the mesh and/or structure of the 3D model is generated, color is able to be added.

Figure 4:
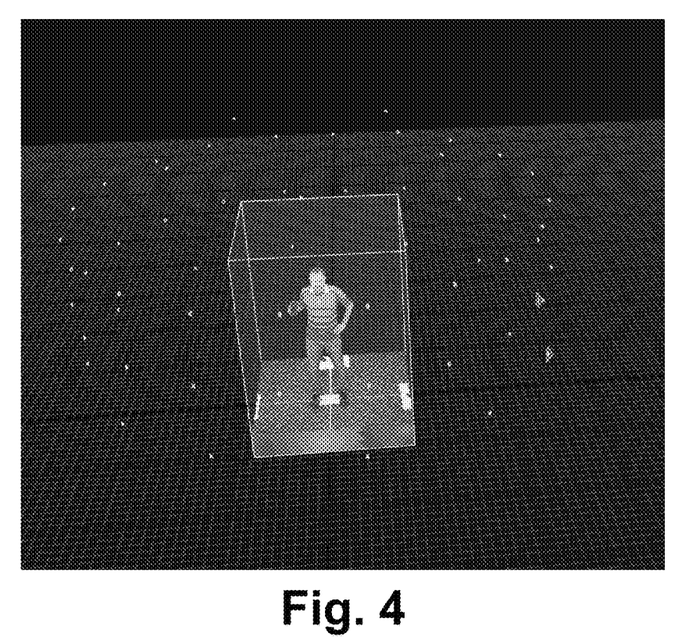
FIG. 4 illustrates a textured 3D model according to some embodiments.

FIG. 4 illustrates a textured 3D model according to some embodiments. After the 3D model is colorized, texture is able to be added.

Figure 5:
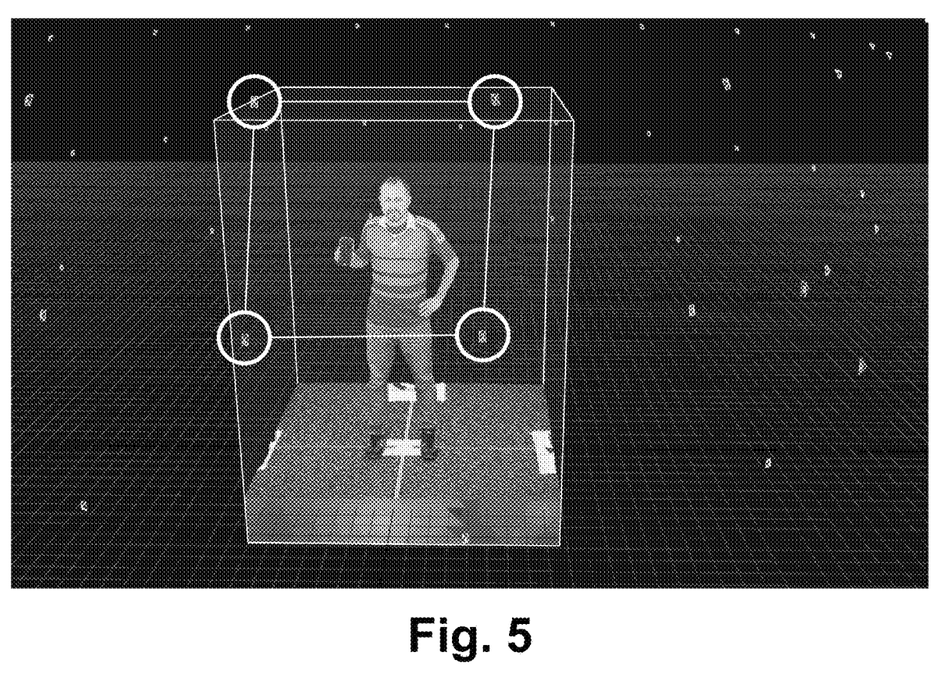
FIG. 5 illustrates an optimized subset of cameras to synthesize a requested view according to some embodiments.

FIG. 5 illustrates an optimized subset of cameras to synthesize a requested view according to some embodiments. As described herein, if the viewer is viewing the subject from the front, the cameras acquiring images/videos of the back of the subject are unhelpful. The frames of the non-optimized subset of cameras are ignored (e.g., not processed). Only data from the minimal/optimized subset or subsets of cameras (e.g., 4 cameras) is processed and transmitted. In other words, a 3D model is able to be generated using 3 or 4 cameras which provide 3 or 4 frames at a time instead of 50 cameras. Post processing is able to be used to clean up the data (e.g., remove outlier information, remove artifacts at the borders).

Figure 6:
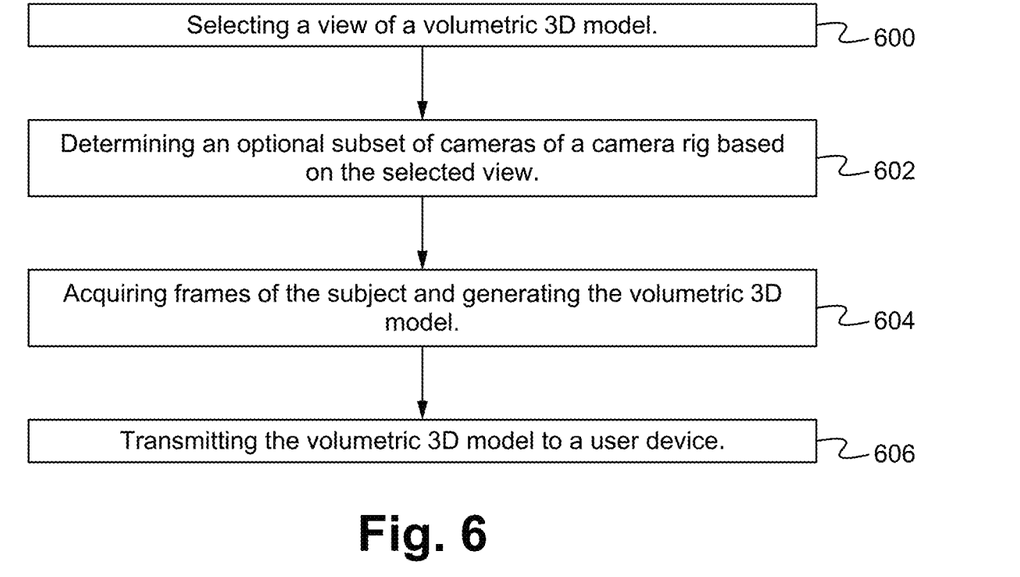
FIG. 6 illustrates a flowchart of a method of implementing minimal volumetric 3D transmission according to some embodiments.

FIG. 6 illustrates a flowchart of a method of implementing minimal volumetric 3D transmission according to some embodiments. In the step 600, a user selects a view of a subject/volumetric 3D model. The user is able to select the view in any manner such as using a GUI on a user device (e.g., smart phone, computer, smart TV). The user selection is received at a computing system (e.g., camera server). In the step 602, the system determines an optimal subset of cameras of a camera rig to utilize to capture frames to generate the volumetric 3D model. For example, a camera rig includes 48 cameras positioned at different angles and/or depths around a subject. Instead of using all of the cameras at once to capture all of the different angles of the subject, a subset (e.g., 3 or 4) of the cameras are used based on the selected view. The optimal subset of cameras is able to be determined in any manner such as comparing acquired frames with an expected view to determine if the frames from the optimal subset of cameras acquire the desired frames. In another example, the optimal subset of cameras are able to be calculated using a mathematical formula based on the viewer's selected angle. In the step 604, the selected cameras acquire frames of the subject, and the frames are used to generate the volumetric 3D model. In the step 606, the volumetric 3D model is transmitted to the user device where the viewer is able to view the volumetric 3D model. In some embodiments, the volumetric 3D model is compressed before being transmitted. U.S. patent application Ser. No. 17/235,255, filed Apr. 20, 2021, and titled HYBRID EDGE-CLOUD COMPRESSION OF VOLUMETRIC 3D DATA FOR EFFICIENT 5G TRANSMISSION discusses point cloud compression, which is hereby incorporated by reference in its entirety for all purposes. If the user changes the view, the process repeats, and a new subset of cameras are selected to generate the volumetric 3D model at a different angle. The change of view is able to include incremental changes. For example, if the user moves the view slightly to the right, the frame changes are incremental as some of the previously used cameras/frames may still be usable. In some embodiments, all of the camera acquire data, but only the data from the optimal subset is processed. In some embodiments, all of the cameras acquire data, and all of the data is processed, but only the data from the optimal subset is transmitted to a client device. In some embodiments, fewer or additional steps are implemented. In some embodiments, the order of the steps is modified.

Figure 7:
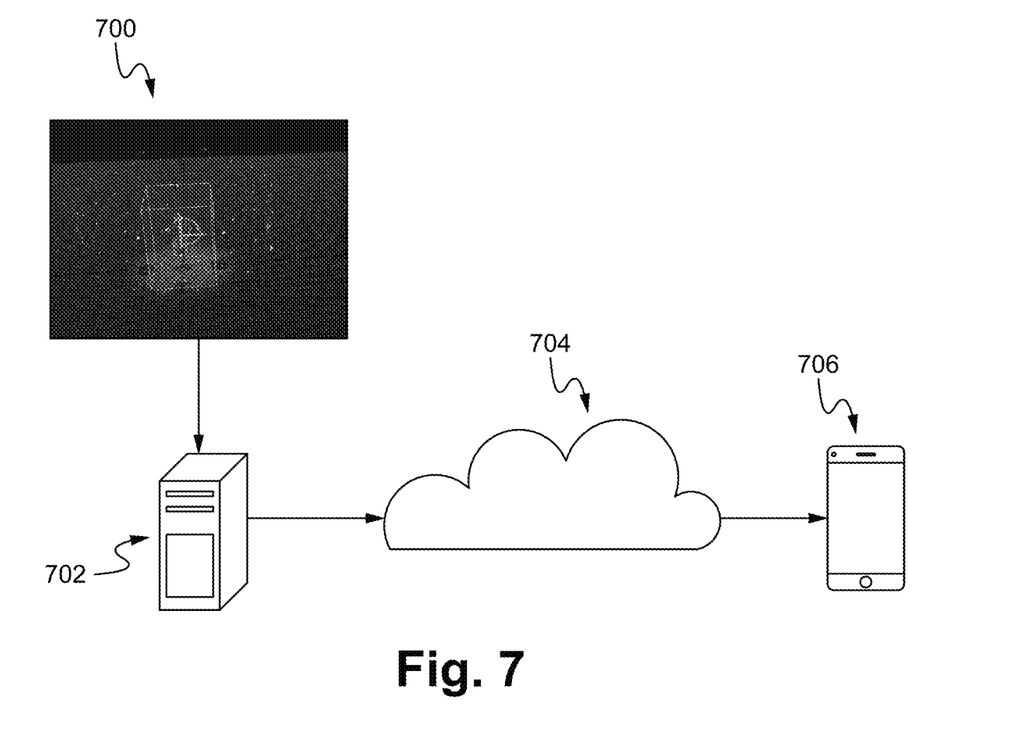
FIG. 7 illustrates a diagram of a network of devices configured for implementing the minimal volumetric 3D transmission scheme according to some embodiments.

FIG. 7 illustrates a diagram of a network of devices configured for implementing the minimal volumetric 3D transmission scheme according to some embodiments. The network of devices includes a camera rig 700, a computing device 702, a network 704 and a client device 706. The camera rig 700, or subject capture system, is able to include a large set of cameras (e.g., 48, 96) positioned at various locations around a subject. The camera rig 700 is able to include any type of camera (e.g., a 4k or 8k camera). In some embodiments, the cameras are configured to communicate with each other and with the computing device 702 (e.g., camera server). Cameras of the camera rig 700 are selected based on a viewing angle received from the client device 706. In some embodiments, the computing device 702 determines which cameras are optimal for generating a volumetric 3D model of the subject based on a selected view from a user. The selected cameras capture data (e.g., images/videos) of the subject which is then used to generate the volumetric 3D model at the computing device 702. The computing device 702 is able to perform other processing steps as well (e.g., artifact removal). The computing device 702 then sends the volumetric 3D model to the client device 706 over the network 704. The network 704 is able to be any network such as a 5G network. The client device 706 is able to be any device such as a mobile phone, tablet, personal computer or smart TV. The user uses the client device 706 to select a view of the subject as well as view the volumetric 3D model.

Figure 8:
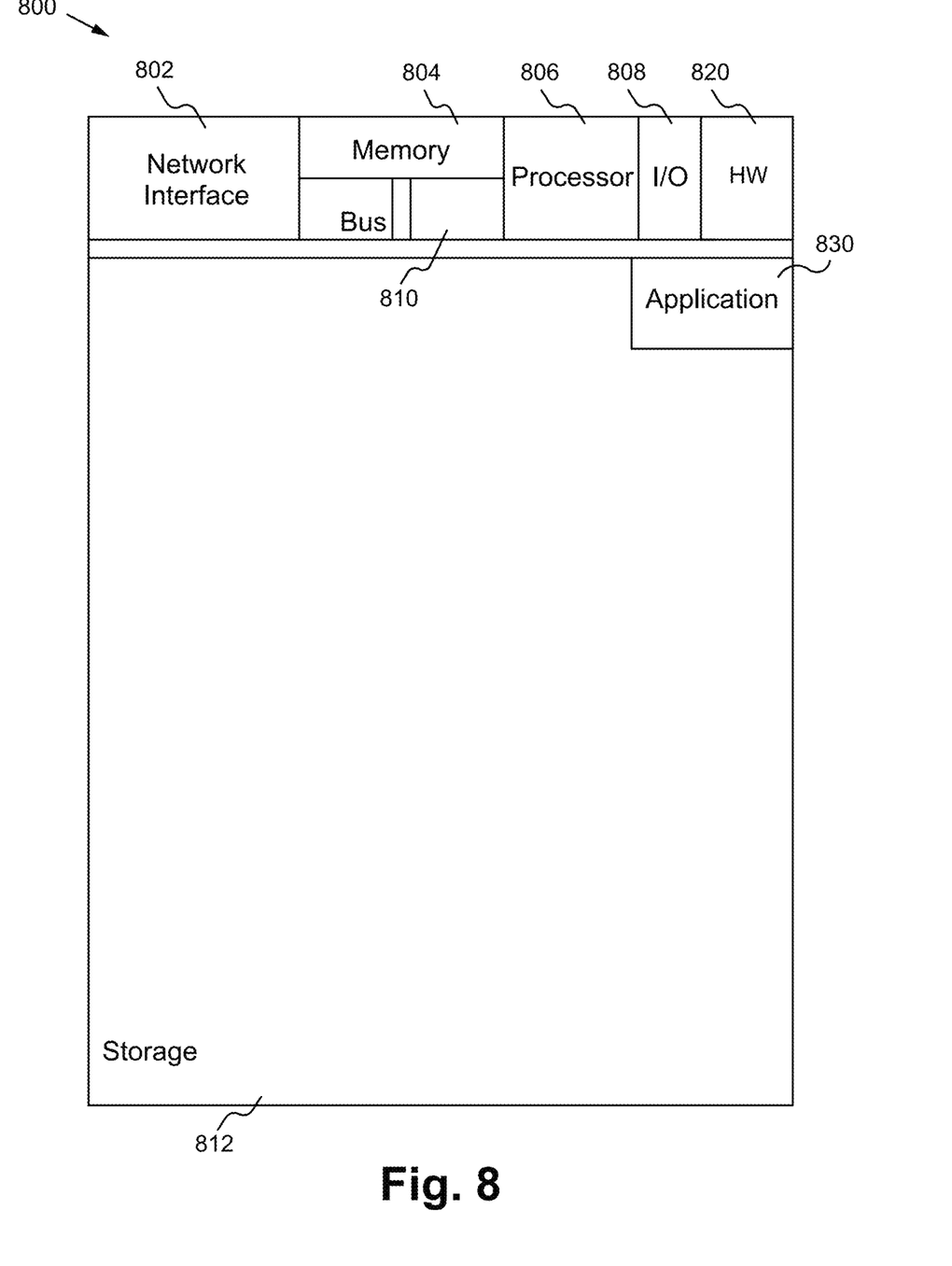
FIG. 8 illustrates a block diagram of an exemplary computing device configured to implement the minimal volumetric 3D transmission method according to some embodiments.

FIG. 8 illustrates a block diagram of an exemplary computing device configured to implement the minimal volumetric 3D transmission method according to some embodiments. The computing device 800 is able to be used to acquire, store, compute, process, communicate and/or display information such as images and videos including 3D content. The computing device 800 is able to implement any of the encoding/decoding aspects. In general, a hardware structure suitable for implementing the computing device 800 includes a network interface 802, a memory 804, a processor 806, I/O device(s) 808, a bus 810 and a storage device 812. The choice of processor is not critical as long as a suitable processor with sufficient speed is chosen. A GPU is also able to be included. The memory 804 is able to be any conventional computer memory known in the art. The storage device 812 is able to include a hard drive, CDROM, CDRW, DVD, DVDRW, High Definition disc/drive, ultra-HD drive, flash memory card or any other storage device. The computing device 800 is able to include one or more network interfaces 802. An example of a network interface includes a network card connected to an Ethernet or other type of LAN. The I/O device(s) 808 are able to include one or more of the following: keyboard, mouse, monitor, screen, printer, modem, touchscreen, button interface and other devices. Minimal volumetric 3D transmission application(s) 830 used to implement the minimal volumetric 3D transmission method are likely to be stored in the storage device 812 and memory 804 and processed as applications are typically processed. More or fewer components shown in FIG. 8 are able to be included in the computing device 800. In some embodiments, minimal volumetric 3D transmission hardware 820 is included. Although the computing device 800 in FIG. 8 includes applications 830 and hardware 820 for the minimal volumetric 3D transmission implementation, the minimal volumetric 3D transmission method is able to be implemented on a computing device in hardware, firmware, software or any combination thereof. For example, in some embodiments, the minimal volumetric 3D transmission applications 830 are programmed in a memory and executed using a processor. In another example, in some embodiments, the minimal volumetric 3D transmission hardware 820 is programmed hardware logic including gates specifically designed to implement the minimal volumetric 3D transmission method.

In some embodiments, the minimal volumetric 3D transmission application(s) 830 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

In some embodiments, the computing device is coupled to a camera or a camera system. In some embodiments, the device is stored locally, remotely or a combination thereof.

To utilize the minimal volumetric 3D transmission method, a user selects a view of a subject, and the system including a computing device and a camera rig determine an optimal subset of cameras to acquire content to generate a volumetric 3D model which is transmitted to the user. The user is able to change the view, which will cause the system to select a different optimal subset of cameras. The minimal volumetric 3D transmission method is able to be implemented with user assistance or automatically without user involvement (e.g., by utilizing artificial intelligence).

In operation, the minimal volumetric 3D transmission method enables more efficient volumetric 3D content transfer and is able to reduce utilized network bandwidth compared to previous implementations.

Some Embodiments of Minimal Volumetric 3D on Demand for Efficient 5G Transmission 1. A method programmed in a non-transitory memory of a device comprising:
   receiving a user selection of a view from a user device;
   determining an optimal subset of cameras less than a full set of cameras of a camera rig to acquire data of a subject based on the user selection of the view;
   generating a volumetric 3D model of the subject based on the user selection of the view; and
   transmitting the volumetric 3D model of the subject to the user device.
2. The method of clause 1 further comprising determining a second optimal subset of cameras less than the full set of cameras when a user changes the view.
3. The method of clause 1 further comprising determining a different optimal subset of cameras less than the full set of cameras when a second user selection of a second view from a second user device is received.
4. The method of clause 1 further comprising compressing the volumetric 3D model before transmitting the volumetric 3D model to the user device.
5. The method of clause 1 further comprising receiving zoom information from the user device to zoom in on the subject.
6. The method of clause 1 wherein the volumetric 3D model comprises a partial volumetric 3D model less than a full 3D model of the subject.
7. The method of clause 1 wherein the volumetric 3D model is transmitted over a 5G network.
8. The method of clause 1 wherein the user selection from the user device is based on a graphical user interface which enables a user to position a virtual camera to specify the view.
9. An apparatus comprising:
   a non-transitory memory for storing an application, the application for:
     receiving a user selection of a view from a user device;
     determining an optimal subset of cameras less than a full set of cameras of a camera rig to acquire data of a subject based on the user selection of the view;
     generating a volumetric 3D model of the subject based on the user selection of the view; and
     transmitting the volumetric 3D model of the subject to the user device; and
   a processor coupled to the memory, the processor configured for processing the application.
10. The apparatus of clause 9 wherein the application is further configured for determining a second optimal subset of cameras less than the full set of cameras when a user changes the view.
11. The apparatus of clause 9 wherein the application is further configured for determining a different optimal subset of cameras less than the full set of cameras when a second user selection of a second view from a second user device is received.
12. The apparatus of clause 9 wherein the application is further configured for compressing the volumetric 3D model before transmitting the volumetric 3D model to the user device.
13. The apparatus of clause 9 wherein the application is further configured for receiving zoom information from the user device to zoom in on the subject.
14. The apparatus of clause 9 wherein the volumetric 3D model comprises a partial volumetric 3D model less than a full 3D model of the subject.
15. The apparatus of clause 9 wherein the volumetric 3D model is transmitted over a 5G network.
16. The apparatus of clause 9 wherein the user selection from the user device is based on a graphical user interface which enables a user to position a virtual camera to specify the view.
17. A system comprising:
   a camera rig comprising a plurality of cameras; and
   a computing device configured for:
     receiving a user selection of a view from a user device;
     determining an optimal subset of cameras less than a full set of cameras of the camera rig to acquire data of a subject based on the user selection of the view;
     generating a volumetric 3D model of the subject based on the user selection of the view; and
     transmitting the volumetric 3D model of the subject to the user device.
18. The system of clause 17 wherein the computing device is further configured for determining a second optimal subset of cameras less than the full set of cameras when a user changes the view.
19. The system of clause 17 wherein the computing device is further configured for determining a different optimal subset of cameras less than the full set of cameras when a second user selection of a second view from a second user device is received.

20. The system of clause 17 wherein the computing device is further configured for compressing the volumetric 3D model before transmitting the volumetric 3D model to the user device.

21. The system of clause 17 wherein the computing device is further configured for receiving zoom information from the user device to zoom in on the subject.

22. The system of clause 17 wherein the volumetric 3D model comprises a partial volumetric 3D model less than a full 3D model of the subject.

23. The system of clause 17 wherein the volumetric 3D model is transmitted over a 5G network.

24. The system of clause 17 wherein the user selection from the user device is based on a graphical user interface which enables a user to position a virtual camera to specify the view.

25. The system of clause 17 wherein the plurality of cameras comprises at least 48 cameras.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
   receiving a user selection of a view from a user device;
   determining a first subset of cameras less than a full set of cameras of a camera rig to acquire data of a subject based on the user selection of the view, wherein determining the first subset of cameras less than the full set of cameras of the camera rig includes comparing acquired frames with an expected view to determine if the frames from the first subset of cameras acquire desired frames;
   generating a volumetric 3D model of the subject based on the user selection of the view;
   transmitting the volumetric 3D model of the subject to the user device; and
   receiving a second user selection that matches a pre-existing selection of one or more additional users, and grouping the second user selection with the pre-existing selection of the one or more additional users, thereby enabling a user to stream a same volumetric 3D model as the one or more additional users.

2. The method of claim 1 further comprising determining a second subset of cameras less than the full set of cameras when a user changes the view.

3. The method of claim 1 further comprising determining a different subset of cameras less than the full set of cameras when an additional user selection of a second view from a second user device is received.

4. The method of claim 1 further comprising compressing the volumetric 3D model before transmitting the volumetric 3D model to the user device.

5. The method of claim 1 further comprising receiving zoom information from the user device to zoom in on the subject.

6. The method of claim 1 wherein the volumetric 3D model comprises a partial volumetric 3D model less than a full 3D model of the subject.

7. The method of claim 1 wherein the volumetric 3D model is transmitted over a 5G network.

8. The method of claim 1 wherein the user selection from the user device is based on a graphical user interface which enables a user to position a virtual camera to specify the view.

9. The method of claim 1 wherein determining the first subset of cameras less than the full set of cameras of the camera rig includes calculating the first subset of cameras using a mathematical formula based on an angle of the user selection of the view.

10. The method of claim 1 further comprising receiving an additional user selection, and incrementally adjusting the first subset of cameras to: include at least one additional camera not previously within the first subset of cameras, exclude at least one camera of the first subset of cameras and continue to include at least one camera of the first subset of cameras.

11. An apparatus comprising:
    a non-transitory memory for storing an application, the application for:
       receiving a user selection of a view from a user device;
       determining a first subset of cameras less than a full set of cameras of a camera rig to acquire data of a subject based on the user selection of the view, wherein determining the first subset of cameras less than the full set of cameras of the camera rig includes comparing acquired frames with an expected view to determine if the frames from the first subset of cameras acquire desired frames;
       generating a volumetric 3D model of the subject based on the user selection of the view; and
       transmitting the volumetric 3D model of the subject to the user device;
       receiving a second user selection that matches a pre-existing selection of one or more additional users, and grouping the second user selection with the pre-existing selection of the one or more additional users, thereby enabling a user to stream a same volumetric 3D model as the one or more additional users; and
    a processor coupled to the memory, the processor configured for processing the application.

12. The apparatus of claim 11 wherein the application is further configured for determining a second subset of cameras less than the full set of cameras when a user changes the view.

13. The apparatus of claim 11 wherein the application is further configured for determining a different subset of cameras less than the full set of cameras when an additional user selection of a second view from a second user device is received.

14. The apparatus of claim 11 wherein the application is further configured for compressing the volumetric 3D model before transmitting the volumetric 3D model to the user device.

15. The apparatus of claim 11 wherein the application is further configured for receiving zoom information from the user device to zoom in on the subject.

16. The apparatus of claim 11 wherein the volumetric 3D model comprises a partial volumetric 3D model less than a full 3D model of the subject.

17. The apparatus of claim 11 wherein the volumetric 3D model is transmitted over a 5G network.

18. The apparatus of claim 11 wherein the user selection from the user device is based on a graphical user interface which enables a user to position a virtual camera to specify the view.

19. A system comprising:
a camera rig comprising a plurality of cameras, wherein the plurality of cameras are positioned to include an overlap of a view by multiple cameras; and
a computing device configured for:
receiving a user selection of a view from a user device;
determining a first subset of cameras less than a full set of cameras of the camera rig to acquire data of a subject based on the user selection of the view, wherein the first subset of cameras is based on the overlap of the view by the multiple cameras, wherein determining the first subset of cameras less than the full set of cameras of the camera rig includes comparing acquired frames with an expected view to determine if the frames from the first subset of cameras acquire desired frames;
generating a volumetric 3D model of the subject based on the user selection of the view; and
transmitting the volumetric 3D model of the subject to the user device; and
receiving a second user selection that matches a pre-existing selection of one or more additional users, and grouping the second user selection with the pre-existing selection of the one or more additional users, thereby enabling a user to stream a same volumetric 3D model as the one or more additional users.

20. The system of claim 19 wherein the computing device is further configured for determining a second subset of cameras less than the full set of cameras when a user changes the view.

21. The system of claim 19 wherein the computing device is further configured for determining a different subset of cameras less than the full set of cameras when an additional user selection of a second view from a second user device is received.

22. The system of claim 19 wherein the computing device is further configured for compressing the volumetric 3D model before transmitting the volumetric 3D model to the user device.

23. The system of claim 19 wherein the computing device is further configured for receiving zoom information from the user device to zoom in on the subject.

24. The system of claim 19 wherein the volumetric 3D model comprises a partial volumetric 3D model less than a full 3D model of the subject.

25. The system of claim 19 wherein the volumetric 3D model is transmitted over a 5G network.

26. The system of claim 19 wherein the user selection from the user device is based on a graphical user interface which enables a user to position a virtual camera to specify the view.

27. The system of claim 19 wherein the plurality of cameras comprises at least 48 cameras.

28. A method programmed in a non-transitory memory of a device comprising:
receiving a user selection of a view from a user device;
determining a first subset of cameras less than a full set of cameras of a camera rig to acquire data of a subject based on the user selection of the view, wherein determining the first subset of cameras less than the full set of cameras of the camera rig includes calculating the first subset of cameras using a mathematical formula based on an angle of the user selection of the view;
generating a volumetric 3D model of the subject based on the user selection of the view;
transmitting the volumetric 3D model of the subject to the user device; and
receiving a second user selection that matches a pre-existing selection of one or more additional users, and grouping the second user selection with the pre-existing selection of the one or more additional users, thereby enabling a user to stream a same volumetric 3D model as the one or more additional users.

29. An apparatus comprising:
a non-transitory memory for storing an application, the application for:
receiving a user selection of a view from a user device;
determining a first subset of cameras less than a full set of cameras of a camera rig to acquire data of a subject based on the user selection of the view, wherein determining the first subset of cameras less than the full set of cameras of the camera rig includes calculating the first subset of cameras using a mathematical formula based on an angle of the user selection of the view;
generating a volumetric 3D model of the subject based on the user selection of the view; and
transmitting the volumetric 3D model of the subject to the user device;
receiving a second user selection that matches a pre-existing selection of one or more additional users, and grouping the second user selection with the pre-existing selection of the one or more additional users, thereby enabling a user to stream a same volumetric 3D model as the one or more additional users; and
a processor coupled to the memory, the processor configured for processing the application.

30. A system comprising:
a camera rig comprising a plurality of cameras, wherein the plurality of cameras are positioned to include an overlap of a view by multiple cameras; and
a computing device configured for:
receiving a user selection of a view from a user device;
determining a first subset of cameras less than a full set of cameras of the camera rig to acquire data of a subject based on the user selection of the view, wherein the first subset of cameras is based on the overlap of the view by the multiple cameras, wherein determining the first subset of cameras less than the full set of cameras of the camera rig includes calculating the first subset of cameras using a mathematical formula based on an angle of the user selection of the view;
generating a volumetric 3D model of the subject based on the user selection of the view; and
transmitting the volumetric 3D model of the subject to the user device; and
receiving a second user selection that matches a pre-existing selection of one or more additional users, and grouping the second user selection with the pre-existing selection of the one or more additional users, thereby enabling a user to stream a same volumetric 3D model as the one or more additional users.

31. A method programmed in a non-transitory memory of a device comprising:
receiving a user selection of a view from a user device;

determining a first subset of cameras less than a full set of cameras of a camera rig to acquire data of a subject based on the user selection of the view;

generating a volumetric 3D model of the subject based on the user selection of the view;

transmitting the volumetric 3D model of the subject to the user device; and receiving a second user selection that matches a pre-existing selection of one or more additional users, and grouping the second user selection with the pre-existing selection of the one or more additional users, thereby enabling a user to stream a same volumetric 3D model as the one or more additional users; and receiving an additional user selection, and incrementally adjusting the first subset of cameras to: include at least one additional camera not previously within the first subset of cameras, exclude at least one camera of the first subset of cameras and continue to include at least one camera of the first subset of cameras.

32. An apparatus comprising:

a non-transitory memory for storing an application, the application for:

receiving a user selection of a view from a user device;

determining a first subset of cameras less than a full set of cameras of a camera rig to acquire data of a subject based on the user selection of the view;

generating a volumetric 3D model of the subject based on the user selection of the view; and transmitting the volumetric 3D model of the subject to the user device;

receiving a second user selection that matches a pre-existing selection of one or more additional users, and grouping the second user selection with the pre-existing selection of the one or more additional users, thereby enabling a user to stream a same volumetric 3D model as the one or more additional users; and receiving an additional user selection, and incrementally adjusting the first subset of cameras to: include at least one additional camera not previously within the first subset of cameras, exclude at least one camera of the first subset of cameras and continue to include at least one camera of the first subset of cameras; and a processor coupled to the memory, the processor configured for processing the application.

33. A system comprising:

a camera rig comprising a plurality of cameras, wherein the plurality of cameras are positioned to include an overlap of a view by multiple cameras; and a computing device configured for:

receiving a user selection of a view from a user device;

determining a first subset of cameras less than a full set of cameras of the camera rig to acquire data of a subject based on the user selection of the view, wherein the first subset of cameras is based on the overlap of the view by the multiple cameras;

generating a volumetric 3D model of the subject based on the user selection of the view; and transmitting the volumetric 3D model of the subject to the user device; and receiving a second user selection that matches a pre-existing selection of one or more additional users, and grouping the second user selection with the pre-existing selection of the one or more additional users, thereby enabling a user to stream a same volumetric 3D model as the one or more additional users; and receiving an additional user selection, and incrementally adjusting the first subset of cameras to: include at least one additional camera not previously within the first subset of cameras, exclude at least one camera of the first subset of cameras and continue to include at least one camera of the first subset of cameras.

* * * * *